US009321498B2

(12) United States Patent
Oikawa (10) Patent No.: US 9,321,498 B2
(45) Date of Patent: Apr. 26, 2016

(54) METHOD OF ESTIMATING MOUNTING ANGLE ERROR OF GYROSCOPES BY USING A TURNING DEVICE, AND CORRESPONDING TURNING DEVICE (71) Applicant: Susumu Oikawa, Yokohama (JP)

(72) Inventor: Susumu Oikawa, Yokohama (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/361,978

(22) PCT Filed: Nov. 29, 2012

(86) PCT No.: PCT/IB2012/002788
§ 371 (c)(1),
(2) Date: May 30, 2014

(87) PCT Pub. No.: WO2013/080040
PCT Pub. Date: Jun. 6, 2013

(65) Prior Publication Data
US 2014/0330507 A1 Nov. 6, 2014

(30) Foreign Application Priority Data
Dec. 2, 2011 (JP) .................................. 2011-265109

(51) Int. Cl.
*B62K 3/00* (2006.01)
*G01C 21/18* (2006.01)
(Continued)

(52) U.S. Cl.
CPC ................ *B62K 3/007* (2013.01); *G01C 21/18* (2013.01); *G01C 25/005* (2013.01); *G05D 1/0891* (2013.01); *B62K 2207/04* (2013.01)

(58) Field of Classification Search
None
See application file for complete search history.

(56) References Cited

U.S. PATENT DOCUMENTS

| 3,164,978 A | 1/1965 | Sharman et al. |
| 8,225,891 B2 * | 7/2012 | Takenaka et al. ............... 180/7.1 |
| 8,342,270 B2 * | 1/2013 | Takenaka et al. ............... 180/7.1 |

(Continued)

FOREIGN PATENT DOCUMENTS

| CN | 200988386 Y | 12/2007 |
| JP | 2001-153680 A | 6/2001 |

(Continued)

OTHER PUBLICATIONS

J. Vaganay, et al., "Mobile Robot Attitude Estimation by Fusion of Internal Data," International Conference on Robotics and Automation, Proceeding of 1993 IEEE, 1050-4729/93, pp. 277-282.

*Primary Examiner* — James Trammell
*Assistant Examiner* — Demetra Smith-Stewart
(74) *Attorney, Agent, or Firm* — Kenyon & Kenyon LLP (57) ABSTRACT Bias values of pitch axis and roll axis angular velocity sensors in a stationary state where a reference yaw axis of a two-wheeled inverted pendulum vehicle body is stationary in parallel with a vertical direction are acquired. Bias values of the pitch axis and roll axis angular velocity sensors in a turning state where a two-wheeled inverted pendulum vehicle is turned at a predetermined turning angular velocity in a state where the reference yaw axis of the two-wheeled inverted pendulum vehicle body remains parallel to the vertical direction are acquired. Mounting angle errors of the pitch axis and roll axis angular velocity sensors with respect to the two-wheeled inverted pendulum vehicle body are estimated on the basis of the bias values of the sensors in the stationary state, the bias values of the sensors in the turning state and the predetermined turning angular velocity.

9 Claims, 6 Drawing Sheets (51) Int. Cl.
*G01C 25/00* (2006.01)
*G05D 1/08* (2006.01)

(56) References Cited

U.S. PATENT DOCUMENTS

| | | | |
|---|---|---|---|
| 8,353,318 B2 * | 1/2013 | Ranalletta et al. | 141/2 |
| 8,403,083 B2 * | 3/2013 | Waita et al. | 180/21 |
| 8,567,537 B2 * | 10/2013 | Gomi et al. | 180/21 |
| 8,577,516 B2 * | 11/2013 | Takenaka et al. | 701/1 |
| 2006/0173578 A1 * | 8/2006 | Takenaka | B62D 7/032 700/245 |
| 2006/0260857 A1 | 11/2006 | Kakinuma et al. | |
| 2009/0056153 A1 | 3/2009 | Tippett et al. | |

FOREIGN PATENT DOCUMENTS

| | | |
|---|---|---|
| JP | 2004-264240 A | 9/2004 |
| JP | 2010-271918 A | 12/2010 |
| JP | 4612980 B2 | 1/2011 |
| JP | 4650327 B2 | 3/2011 |
| WO | 01/02920 A1 | 1/2001 |

* cited by examiner

METHOD OF ESTIMATING MOUNTING ANGLE ERROR OF GYROSCOPES BY USING A TURNING DEVICE, AND CORRESPONDING TURNING DEVICE

CROSS-REFERENCE TO RELATED APPLICATIONS

This is a national phase application based on the PCT International Patent Application No. PCT/IB2012/002788 filed on Nov. 29, 2012, claiming priority to Japanese application No. 2011-265109 filed Dec. 2, 2011, the entire contents of both of which are incorporated herein by reference.

BACKGROUND OF THE INVENTION

1. Field of the Invention

The invention relates to a method of estimating a mounting angle error, and a turning device.

2. Description of Related Art

As a technique of this type, Japanese Patent Application Publication No. 2010-271918 (JP 2010-271918 A) describes attitude control over a two-wheeled inverted pendulum robot that uses an angular velocity sensor (gyro sensor) and an acceleration sensor. Because an output value of the angular velocity sensor degrades over time, a correction value of the angular velocity sensor is obtained by, for example, supporting the two-wheeled inverted pendulum robot with a special jig and then the two-wheeled inverted pendulum robot is rotated at a set rotation speed from a rearmost inclined position to a frontmost inclined position in JP 2010-271918 A.

Incidentally, if there is an error in a mounting angle of a pitch axis angular velocity sensor for executing inverted pendulum control over a two-wheeled inverted pendulum vehicle with respect to a reference axis of a body, when the two-wheeled inverted pendulum vehicle turns (turns around its yaw axis), a turning component of the error may be detected by the pitch axis angular velocity sensor and, therefore, an inverted pendulum reference angle may gradually deviate. As a result, the two-wheeled inverted pendulum vehicle is inverted in a state where the vehicle is inclined forward or rearward when the vehicle stops turning. This makes an occupant experience discomfort.

In addition, similarly, if there is an error of a mounting angle of a roll axis angular velocity sensor with respect to the reference axis of the body, when the vehicle turns, forward or rearward inclination of the two-wheeled inverted pendulum vehicle sways to vary. This similarly makes the occupant experience discomfort.

Against such a problem, in an existing art, a measure is taken for setting errors of the mounting angles of the respective angular velocity sensors with respect to the reference axis of the body to zero as much as possible. In this measure, there is a problem in terms of reduction in the size and weight of the body of the two-wheel inverted pendulum vehicle because a high-accuracy frame for ensuring various accuracies, such as a mounting accuracy between each angular velocity sensor and an inclination sensor that serves as a horizontal reference axis and a mounting accuracy between a sensor block, which includes the angular velocity sensors and the inclination sensor, and the body of the two-wheeled inverted pendulum vehicle, is required, for example.

Further description will be made on the above-described problem due to a mounting error. It is assumed that, for example, a mounting error of the pitch axis angular velocity sensor, which is used to execute inverted pendulum control over the two-wheeled inverted pendulum vehicle, with respect to a turning plane (that is, a yaw turning plane) is $\beta_0$ [rad] around the roll axis and the vehicle turns at an angular velocity $\gamma$ dot. In this case, $\gamma$ dot$\times\sin(\beta_0)$ [rad/sec] is output from the pitch axis angular velocity sensor as an error. Specifically, when the mounting error $\beta_0$ of the pitch axis angular velocity sensor with respect to the turning axis is 0.5 [deg], rotation around the pitch axis is recognized through a turn of 360 [deg] as if the vehicle rotates an accumulation of about 3 [deg] around the pitch axis.

Such an error of pitch angular velocity through a turn occurs in a relatively low frequency band, so it is conceivable that an error is cancelled by a high-pass filter or using deadband (neutral zone). However, for example, when a turn direction is changed rightward or leftward minutely, the high-pass filter is not useful at all, so there may be an accumulation of errors in computation process of obtaining a pitch angle by integrating a pitch angular velocity, and the pitch angle may deviate unlimitedly.

SUMMARY OF THE INVENTION

The invention provides a technique for estimating an error of a mounting angle of each of a pitch axis angular velocity sensor and a roll axis angular velocity sensor with respect to an inverted pendulum mobile unit body.

An aspect of the invention provides a method of estimating, in an inverted pendulum mobile unit that includes an inverted pendulum mobile unit body, a pitch axis angular velocity sensor and a roll axis angular velocity sensor, a mounting angle error of the pitch axis angular velocity sensor and a mounting angle error of the roll axis angular velocity sensor with respect to the inverted pendulum mobile unit body. The method includes: acquiring a bias value of the pitch axis angular velocity sensor and a bias value of the roll axis angular velocity sensor in a stationary state where a reference yaw axis of the inverted pendulum mobile unit body is stationary in a vertical direction by acquiring an output from the pitch axis angular velocity sensor and an output from the roll axis angular velocity sensor in the stationary state; acquiring a bias value of the pitch axis angular velocity sensor and a bias value of the roll axis angular velocity sensor in a turning state where the inverted pendulum mobile unit is turned at a predetermined turning angular velocity in a state where the reference yaw axis of the inverted pendulum mobile unit body remains parallel to the vertical direction by acquiring an output from the pitch axis angular velocity sensor and an output from the roll axis angular velocity sensor in the turning state; and estimating the mounting angle error of the pitch axis angular velocity sensor and the mounting angle error of the roll axis angular velocity sensor with respect to the inverted pendulum mobile unit body on the basis of the bias values of the sensors in the stationary state, the bias values of the sensors in the turning state and the predetermined turning angular velocity. In the turning state, the mobile unit body may be turned on the spot while being held horizontally. The inverted pendulum mobile unit may be turned on a pivot in an inverted state. The inverted pendulum mobile unit may be turned on a pivot with the use of a turning device that includes: a support base that supports the inverted pendulum mobile unit; a plurality of support legs that are adjustable in height and that are connected to the support base; and a rotary jig that has a first member connected to the support base and a second member connected to the inverted pendulum mobile unit body and in which the first member is coupled to the second member such that the first member is rotatable in parallel with the support base.

Another aspect of the invention provides a turning device. The turning device includes: a support base that supports the inverted pendulum mobile unit; a plurality of support legs that are adjustable in height and that are connected to the support base; and a rotary jig that has a first member connected to the support base and a second member connected to the inverted pendulum mobile unit body and in which the first member is coupled to the second member such that the first member is rotatable in parallel with the support base. The above turning device may be used in the above-described method.

According to the aspects of the invention, it is possible to estimate a mounting angle error of the pitch axis angular velocity sensor and a mounting angle error of the roll axis angular velocity sensor with respect to the inverted pendulum mobile unit body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a first embodiment of the invention will be described with reference to FIG. 1 to FIG. 5.

Figure 1:
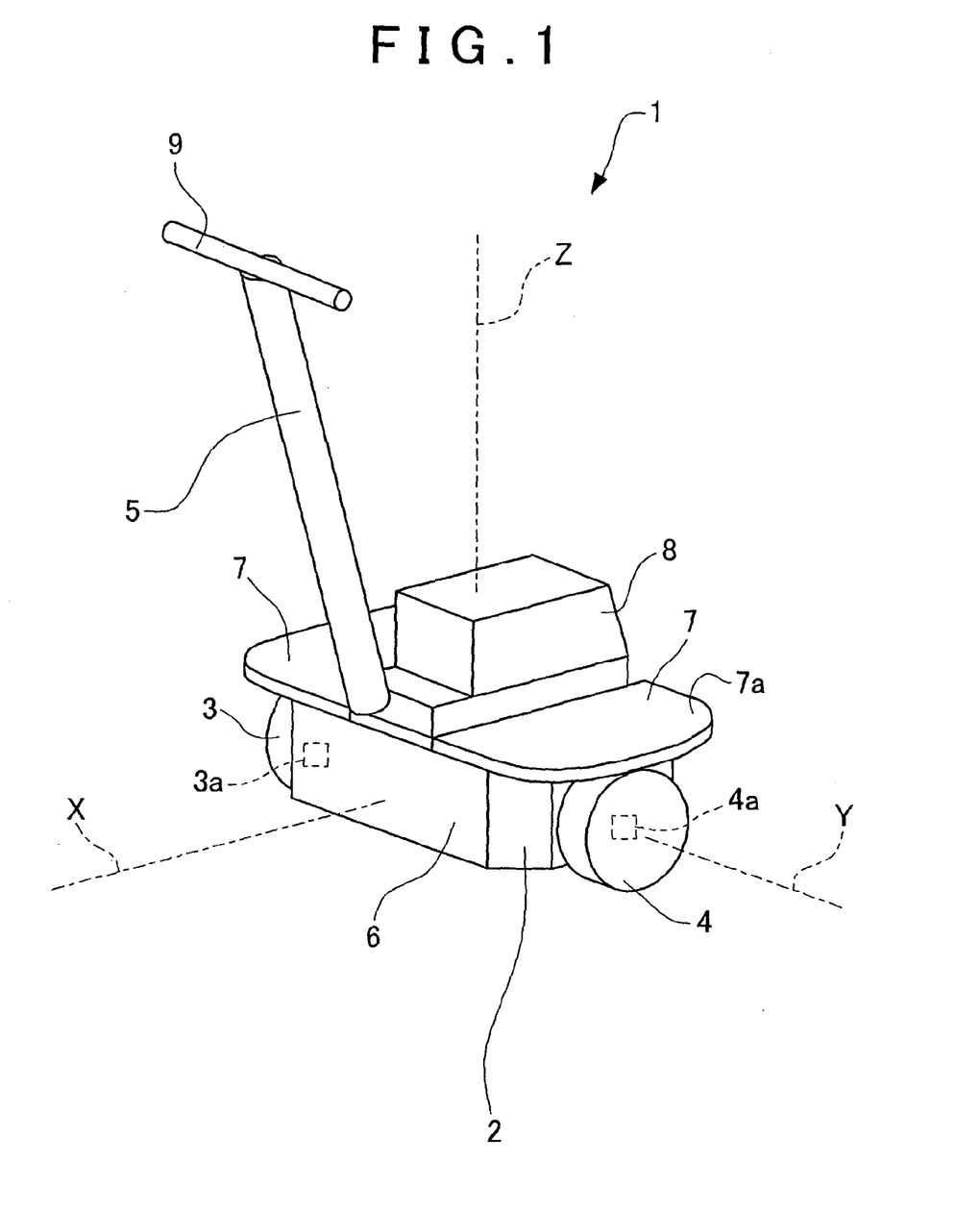
FIG. 1 is a perspective view of the appearance of a two-wheeled inverted pendulum vehicle according to a first embodiment.

A two-wheeled inverted pendulum vehicle 1 (inverted pendulum mobile unit) shown in FIG. 1 is a vehicle that is used to transport a person (occupant) riding on the two-wheeled inverted pendulum vehicle 1 in a desired direction. The two-wheeled inverted pendulum vehicle 1 moves in response to operation of an occupant who rides on the two-wheeled inverted pendulum vehicle 1.

The two-wheeled inverted pendulum vehicle 1 is formed of a two-wheeled inverted pendulum vehicle body 2, a right wheel 3, a left wheel 4 and a handle body 5. The right wheel 3 and the left wheel 4 serve as a pair of wheels that are rotatably connected to the two-wheeled inverted pendulum vehicle body 2. The handle body 5 serves as an operation input unit.

The two-wheeled inverted pendulum vehicle body 2 is formed of a body lower portion 6, a pair of footrests 7 and a control device 8. A battery, or the like, is mounted at the body lower portion 6. The pair of footrests 7 is provided on the body lower portion 6. The control device 8 is provided on the body lower portion 6. The handle body 5 is connected to the body lower portion 6 of the two-wheeled inverted pendulum vehicle body 2. The handle body 5 is mounted at a main travelling direction side of the body lower portion 6 of the two-wheeled inverted pendulum vehicle body 2. A grip 9 is provided at the upper end of the handle body 5. The occupant holds the grip 9. A right wheel motor 3a is provided at the right wheel 3. A left wheel motor 4a is provided at the left wheel 4.

A reference yaw axis Z that serves as a reference yaw axis of the two-wheeled inverted pendulum vehicle body 2 is, for example, defined so as to be perpendicular to footrest faces 7a of the footrests 7. Similarly, a reference pitch axis Y that serves as a reference pitch axis of the two-wheeled inverted pendulum vehicle body 2 is, for example, defined as a rotation axis common to the pair of right wheel 3 and left wheel 4 that are rotatably connected to the body lower portion 6 of the two-wheeled inverted pendulum vehicle body 2. In addition, a reference roll axis X that serves as a reference roll axis of the two-wheeled inverted pendulum vehicle body 2 is, for example, defined as an axis perpendicular to the reference yaw axis Z and perpendicular to the reference pitch axis Y.

Figure 2:
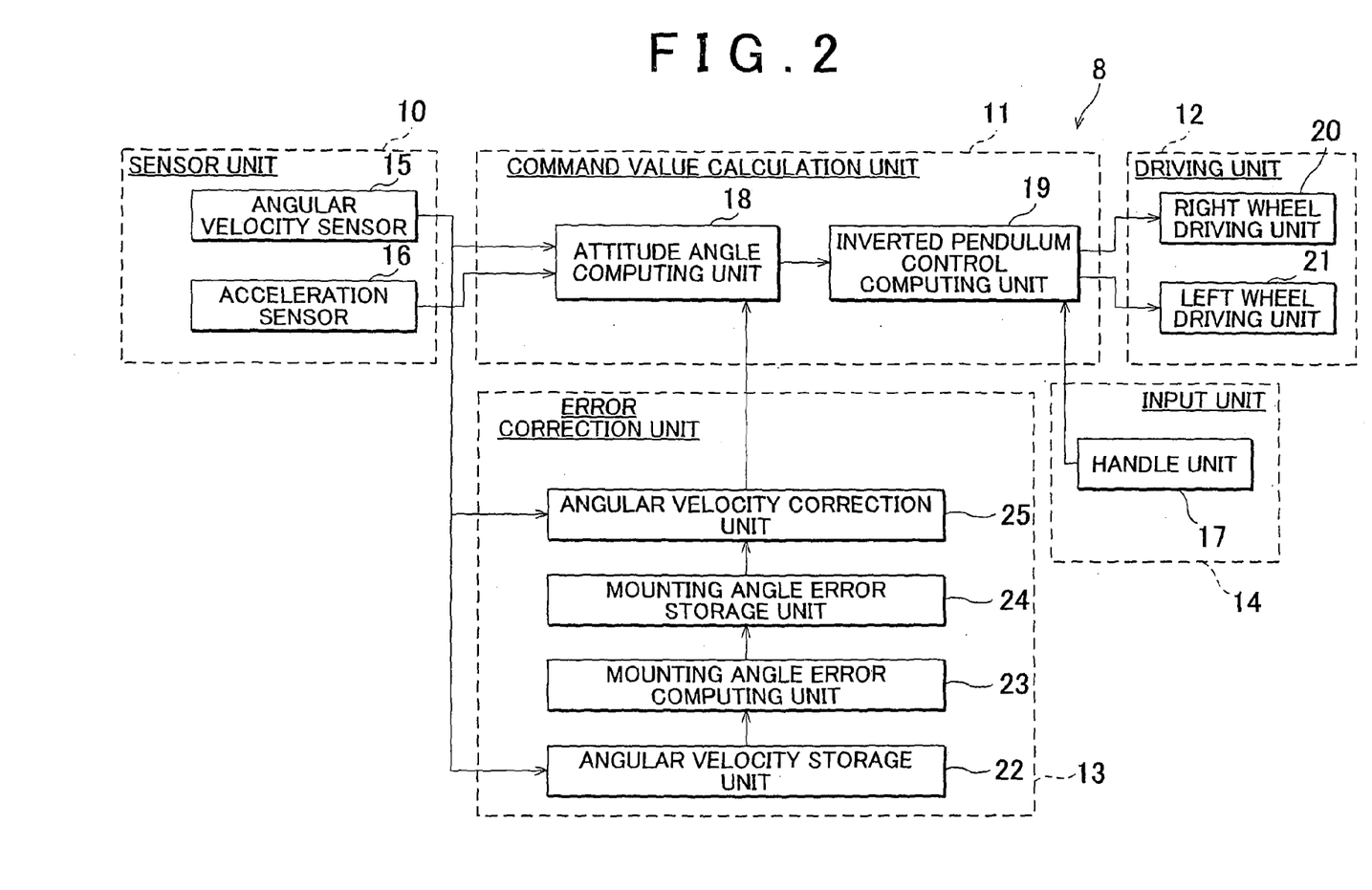
FIG. 2 is a functional block diagram of the two-wheeled inverted pendulum vehicle according to the first embodiment.

As shown in FIG. 2, the control device 8 includes a sensor unit 10, a command value calculation unit 11, a driving unit 12, an error correction unit 13 and an input unit 14.

The sensor unit 10 is formed of an angular velocity sensor 15 and an acceleration sensor 16. The angular velocity sensor 15 is, for example, formed of gyro sensors. That is, the angular velocity sensor 15 is formed of a yaw axis angular velocity sensor, a pitch axis angular velocity sensor and a roll axis angular velocity sensor. The yaw axis angular velocity sensor outputs a yaw angular velocity value of the two-wheeled inverted pendulum vehicle body 2. The pitch axis angular velocity sensor outputs a pitch angular velocity value of the two-wheeled inverted pendulum vehicle body 2. The roll axis angular velocity sensor outputs a roll angular velocity value of the two-wheeled inverted pendulum vehicle body 2. In addition, the acceleration sensor 16 outputs the three-axis acceleration values of the two-wheeled inverted pendulum vehicle body 2.

The input unit 14 is formed of a handle unit 17. The handle unit 17 outputs an inclination angle value from an initial mounted state of the handle body 5 shown in FIG. 1. That is, the occupant controls the movement of the two-wheeled inverted pendulum vehicle 1 by inclining the handle unit 17 in a desired direction.

The command value calculation unit 11 is formed of an attitude angle computing unit 18 and an inverted pendulum control computing unit 19.

The attitude angle computing unit 18 is a module that computes a current attitude angle value of the two-wheeled inverted pendulum vehicle body 2 by performing sensor fusion over the respective axis angular velocity values output from the angular velocity sensor 15 and the respective axis acceleration values output from the acceleration sensor 16 with the use of Kalman filter, or the like.

The inverted pendulum control computing unit 19 is a module that computes and generates control information required to keep a state where the two-wheeled inverted pendulum vehicle 1 is inverted on the basis of the attitude angle value of the two-wheeled inverted pendulum vehicle body 2, computed by the attitude angle computing unit 18. In addition, the inverted pendulum control computing unit 19 computes and generates control information required to cause the two-wheeled inverted pendulum vehicle 1 to perform desired movement while keeping the inverted state of the two-wheeled inverted pendulum vehicle 1 on the basis of the attitude angle value of the two-wheeled inverted pendulum vehicle body 2, computed by the attitude angle computing unit 18, and input information received from the handle unit 17 of the input unit 14.

The driving unit 12 is formed of a right wheel driving unit 20 and a left wheel driving unit 21. The right wheel driving unit 20 and the left wheel driving unit 21 respectively drive the right wheel motor 3a and the left wheel motor 4a on the basis of the control information received from the inverted pendulum control computing unit 19 of the command value calculation unit 11.

The error correction unit 13 is formed of an angular velocity storage unit 22, a mounting angle error computing unit 23, a mounting angle error storage unit 24 and an angular velocity correction unit 25. The angular velocity storage unit 22 stores the respective axis angular velocity values output from the angular velocity sensor 15. The mounting angle error computing unit 23 computes error values of mounting angles of the angular velocity sensor 15 on the two-wheeled inverted pendulum vehicle body 2 on the basis of the respective axis angular velocity values stored in the angular velocity storage unit 22. The mounting angle error storage unit 24 stores the error values of the mounting angles, computed by the mounting angle error computing unit 23. The angular velocity correction unit 25 corrects the respective axis angular velocities output from the angular velocity sensor 15 on the basis of the error values of the mounting angles, stored in the mounting angle error storage unit 24, and outputs the corrected axis angular velocities to the attitude angle computing unit 18.

The above-described control device 8 includes a central processing unit (CPU), a random access memory (RAM) and a read only memory (ROM). A control program stored in the ROM is loaded by the CPU, and is executed on the CPU. By so doing, the control program causes hardware, such as the CPU, to function as the command value calculation unit 11, the error correction unit 13, or the like.

Figure 3:
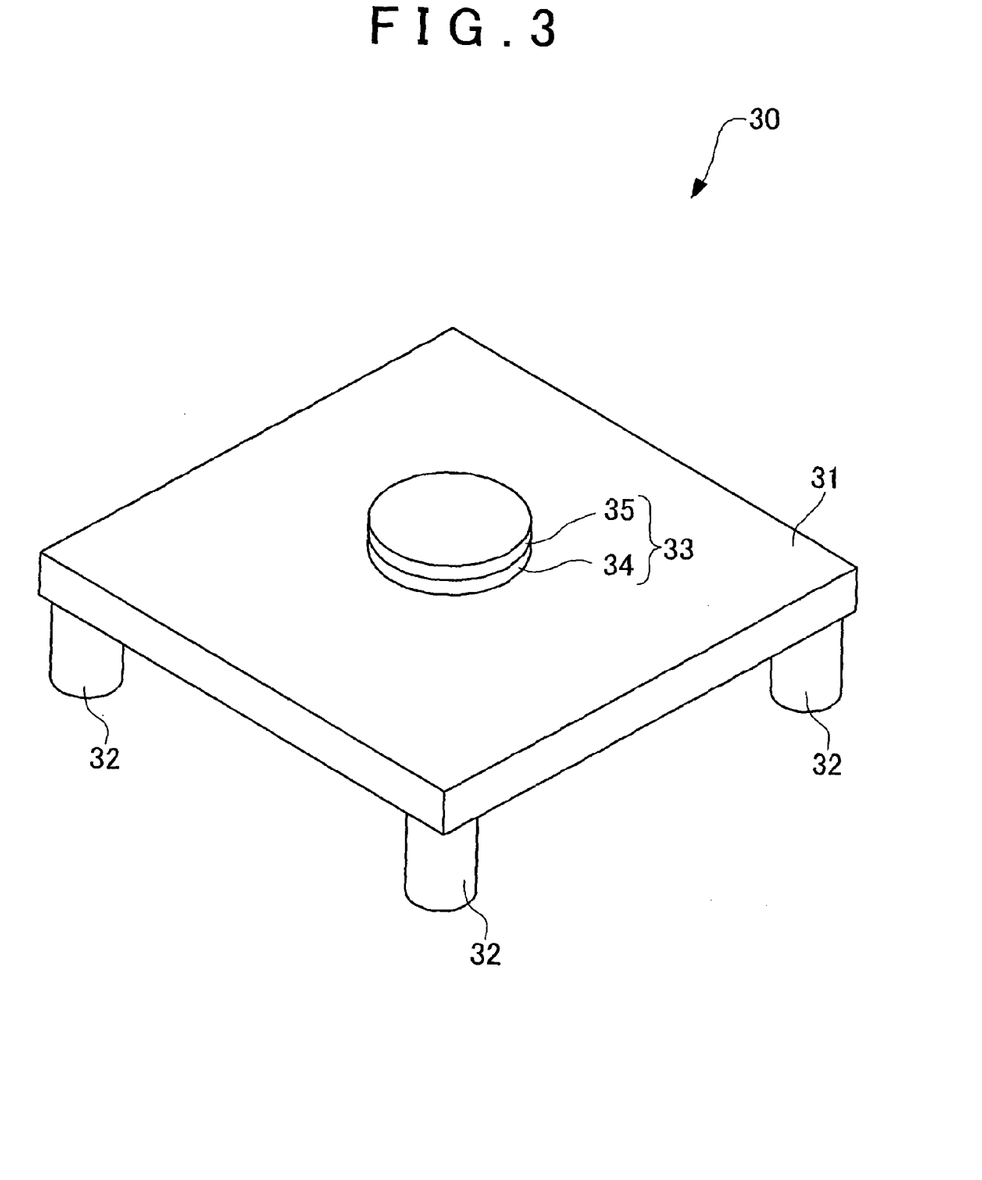
FIG. 3 is a perspective view of a horizontal turning device according to the first embodiment.

FIG. 3 shows a horizontal turning device 30 (turning device) that is used to estimate errors of the mounting angles of the angular velocity sensor 15 with respect to the two-wheeled inverted pendulum vehicle body 2 in the present embodiment. The horizontal turning device 30 is formed of a support base 31, four support legs 32 and a rotary jig 33. The four support legs 32 are adjustable in height, and are connected to the support base 31. By adjusting the height of each of the four support legs 32, the support base 31 is adjusted to a substantially horizontal state. The rotary jig 33 includes a lower jig 34 (first member) and an upper jig 35 (second member). The lower jig 34 is connected to the support base 31. The upper jig 35 is connected to the two-wheeled inverted pendulum vehicle body 2. The lower jig 34 is coupled to the upper jig 35 such that the upper jig 35 is rotatable horizontally with respect to the support base 31.

Figure 4:
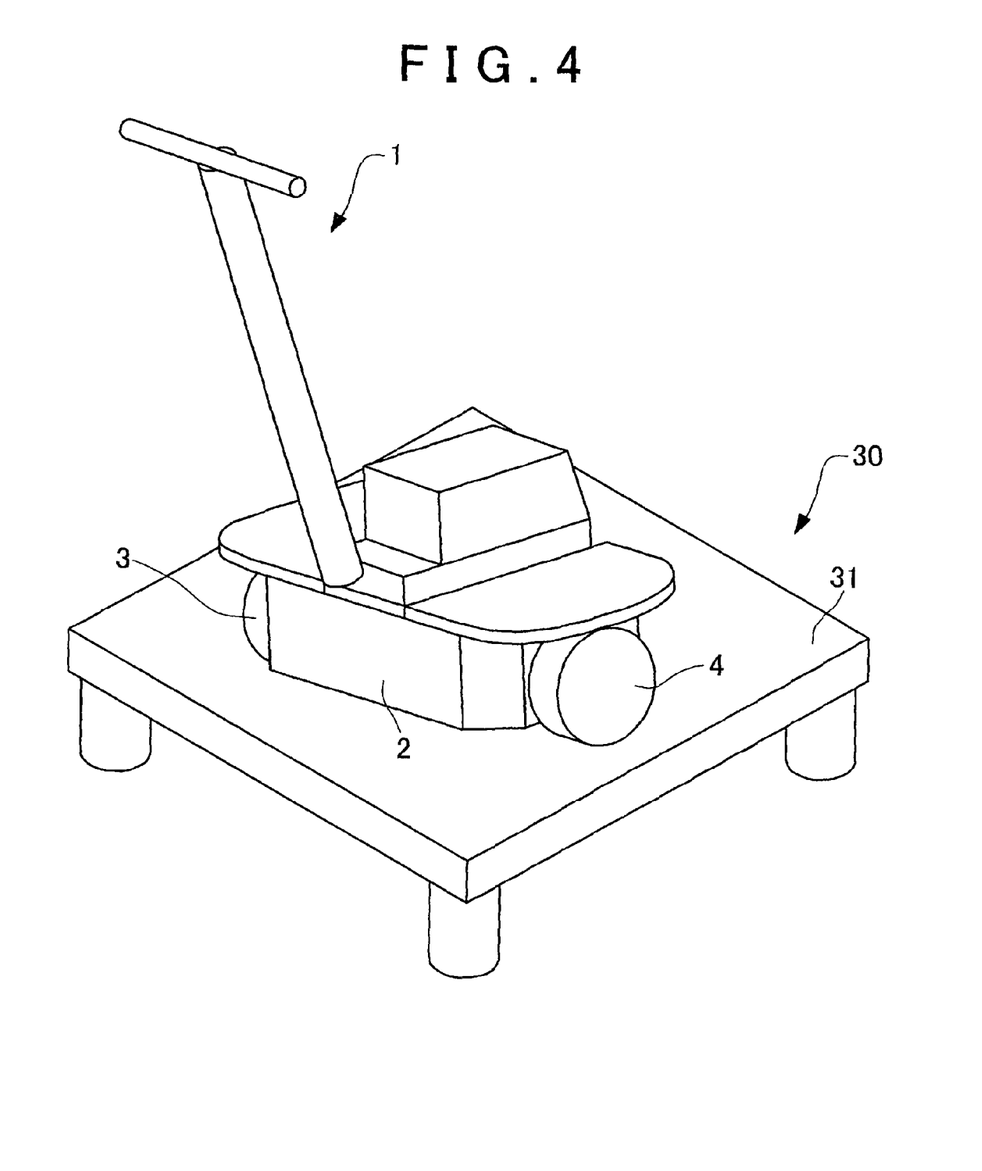
FIG. 4 is a perspective view that shows a state where the two-wheeled inverted pendulum vehicle is set on the horizontal turning device according to the first embodiment.

FIG. 4 shows the two-wheeled inverted pendulum vehicle 1 set on the horizontal turning device 30. In the state shown in FIG. 4, the right wheel 3 and left wheel 4 of the two-wheeled inverted pendulum vehicle 1 are in contact with the support base 31 of the horizontal turning device 30 at an appropriate pressure. In this state, when the right wheel 3 and the left wheel 4 are rotated in opposite directions, the two-wheeled inverted pendulum vehicle 1 makes a pivot turn (turn by rotating the two wheels in opposite directions at the same speed) at a predetermined turning angular velocity.

Figure 5:
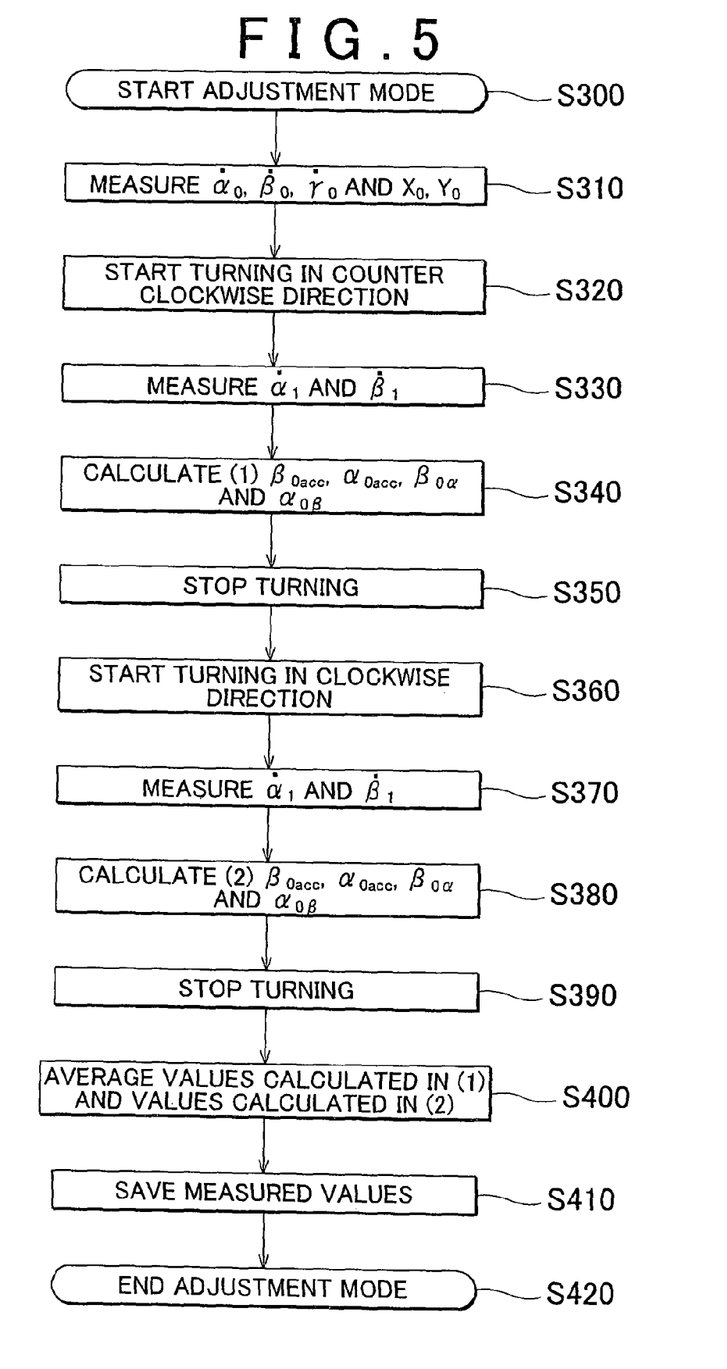
FIG. 5 is a control flow of an adjustment mode according to the first embodiment.

Next, the control flow of the control device 8 of the two-wheeled inverted pendulum vehicle 1 will be described with reference to FIG. 5. The control device 8 of the two-wheeled inverted pendulum vehicle 1 has an adjustment mode shown in FIG. 5 in addition to a normal travel mode for transporting the occupant. The adjustment mode is a mode for estimating errors of the mounting angles of the angular velocity sensor 15 with respect to the two-wheeled inverted pendulum vehicle body 2 of the two-wheeled inverted pendulum vehicle 1.

First, a resolution theory in the background of the adjustment mode will be described, and, subsequently, description of the control flow of FIG. 5 for estimating errors actually using the theory will be made.

In order to measure the attitude of the two-wheeled inverted pendulum vehicle, an inclination sensor (which corresponds to the acceleration sensor 16) that measures a pitch axis angle and a roll axis angle and an angular velocity sensor (which corresponds to the angular velocity sensor 15) that measures a pitch angular velocity, a roll angular velocity and a yaw angular velocity are used. The inclination sensor generally performs the following computation by utilizing the three-axis acceleration sensor, and then obtains a pitch axis angle $\alpha_{0acc}$ and a roll axis angle $\beta_{0acc}$. The pitch axis angle $\alpha_{0acc}$ is an error of the mounting angle of the three-axis acceleration sensor with respect to the body around the pitch axis. The roll axis angle $\beta_{0acc}$ is an error of the mounting angle of the three-axis acceleration sensor with respect to the body around the roll axis. However, a small-size three-axis acceleration sensor suitable for installation on the two-wheeled inverted pendulum vehicle generally has large noise and is not appropriate for inverted pendulum control if the small-size three-axis acceleration sensor is used as it is. This is because, if a low-pass filter is used in order to reduce noise, inverted pendulum control becomes instable due to a phase delay of the filter.

In contrast to this, a gyroscope (may also be called gyro sensor) that is the angular velocity sensor is required to perform integration in order to obtain an angle, so a drift occurs in inverted pendulum control executed for a long period of time, and the reference angle gradually deviates. This is because a zero point of the gyro sensor is not strictly obtained, the zero point changes depending on a temperature, or the like.

Thus, sensor fusion is performed over these two types of sensors, and a portion that is not a specialty of each sensor is complemented by the other. By so doing, a sensor unit having a desirable characteristic is obtained. Kalman filter, or the like, is, for example, utilized for sensor fusion. When Kalman filter is utilized, it is possible to estimate a zero point error, that is, a bias value, of the gyro sensor. An estimated bias value automatically varies such that an angle integrated by the gyro sensor converges to an angle measured by the acceleration sensor.

Here, mounting errors of the three-axis acceleration sensors X (roll axis direction), Y (pitch axis direction) and Z (yaw axis direction) and mounting errors of the roll, pitch and yaw angular velocity sensors will be considered.

Deviations of measured values of the acceleration sensors are zero point offsets $X_0$, $Y_0$ and $Z_0$ of the respective axis sensors, and mounting angle deviations of the acceleration sensors from a vehicle body reference axis (for example, the reference yaw axis Z of the two-wheeled inverted pendulum vehicle body 2 of the two-wheeled inverted pendulum vehicle 1) of the two-wheeled inverted pendulum vehicle are $\alpha_{0acc}$ (which corresponds to a deviation around the reference roll axis X of the two-wheeled inverted pendulum vehicle body 2 of the two-wheeled inverted pendulum vehicle 1), $\beta_{0acc}$ (which corresponds to a deviation around the reference pitch axis Y of the two-wheeled inverted pendulum vehicle body 2 of the two-wheeled inverted pendulum vehicle 1) and $\gamma_{0acc}$. In this way, there are six deviations in total. Among these, only $\alpha_{0acc}$ and $\beta_{0acc}$ are required to execute inverted pendulum control. In an inverted pendulum control state, the Z-axis output of the acceleration sensor is about 1 G, and the offset $Z_0$ of the zero point may be ignored. The mounting angle deviation $\gamma_{0acc}$ in the turning direction is also not utilized for inverted pendulum control. $X_0$ and $Y_0$ may be representatively considered by $\alpha_{0acc}$ and $\beta_{0acc}$. The following rotation matrices (1) and (2) that use the two angles are transformation matrices of an acceleration sensor reference coordinate system (suffix "s") and vehicle body reference coordinate system (suffix "b").

[Mathematical Expression 1]

$$\begin{pmatrix} X_S \\ Y_S \\ Z_S \end{pmatrix} = \begin{pmatrix} \cos\beta_{0acc} & 0 & -\sin\beta_{0acc} \\ 0 & 1 & 0 \\ \sin\beta_{0acc} & 0 & \cos\beta_{0acc} \end{pmatrix} \begin{pmatrix} 1 & 0 & 0 \\ 0 & \cos\alpha_{0acc} & \sin\alpha_{0acc} \\ 0 & -\sin\alpha_{0acc} & \cos\alpha_{0acc} \end{pmatrix} \begin{pmatrix} X_b \\ Y_b \\ Z_b \end{pmatrix} \quad (1)$$

[Mathematical Expression 2]

$$\begin{pmatrix} X_b \\ Y_b \\ Z_b \end{pmatrix} = \begin{pmatrix} 1 & 0 & 0 \\ 0 & \cos\alpha_{0acc} & -\sin\alpha_{0acc} \\ 0 & \sin\alpha_{0acc} & \cos\alpha_{0acc} \end{pmatrix} \begin{pmatrix} \cos\beta_{0acc} & 0 & \sin\beta_{0acc} \\ 0 & 1 & 0 \\ -\sin\beta_{0acc} & 0 & \cos\beta_{0acc} \end{pmatrix} \begin{pmatrix} X_S \\ Y_S \\ Z_S \end{pmatrix} \quad (2)$$

When the fact that $\beta_{0acc}$ and $\alpha_{0acc}$ in the above mathematical expression (2) both are small values close to zero is taken into consideration, the above mathematical expression (2) may be modified into the following mathematical expression (3).

[Mathematical Expression 3]

$$\begin{pmatrix} X_b \\ Y_b \\ Z_b \end{pmatrix} = \begin{pmatrix} 1 & 0 & \sin\beta_{0acc} \\ 0 & 1 & -\sin\alpha_{0acc} \\ -\sin\beta_{0acc} & \sin\alpha_{0acc} & 1 \end{pmatrix} \begin{pmatrix} X_S \\ Y_S \\ Z_S \end{pmatrix} = \begin{pmatrix} Z_S + Z_S \cdot \sin\beta_{0acc} \\ Y_S - Z_S \cdot \sin\alpha_{0acc} \\ Z_S - X_S \cdot \sin\beta_{0acc} + Y_S \cdot \sin\alpha_{0acc} \end{pmatrix} \quad (3)$$

Similarly, there are six mounting deviations of the gyro sensors ($\alpha$ indicates the roll axis, $\beta$ indicates the pitch axis and $\gamma$ indicates the yaw axis) in total, that is, a mounting pitch angle deviation $\alpha_{0\beta}$ and mounting yaw angle deviation $\alpha_{0\gamma}$ of the roll axis gyro, a mounting roll angle deviation $\beta_{0\alpha}$ and mounting yaw angle deviation $\beta_{0\gamma}$ of the pitch axis gyro and a mounting roll angle deviation $\gamma_{0\alpha}$ and mounting pitch angle deviation $\gamma_{0\beta}$ of the yaw axis gyro. However, the two-wheeled inverted pendulum vehicle does not continue rotating around the pitch axis, so there is no problem if there is an error in $\alpha_{0\gamma}$ or $\gamma_{0\alpha}$ and, accordingly, it does not matter that the error is assumed as zero. Similarly, the two-wheeled inverted pendulum vehicle does not continue rotating around the roll axis, so it does not matter that $\beta_{0\gamma}$ and $\gamma_{0\beta}$ are also assumed as zero. Thus, angle deviations to be considered are only $\alpha_{0\beta}$ and $\beta_{0\alpha}$. A transformation matrix that rotates the gyro sensor reference coordinate system (suffix "s") to the vehicle body reference coordinate system (suffix "b") using $\alpha_{0\beta}$ and $\beta_{0\alpha}$ is the following mathematical expressions (4) and (5). In the following mathematical expression (4), and the like, $\alpha_s$ dot is an output value of the roll axis angular velocity sensor. $\beta_s$ dot is an output value of the pitch axis angular velocity sensor. $\gamma_s$ dot is an output value of the yaw axis angular velocity sensor. $\alpha_b$ dot is a roll angular velocity of the two-wheeled inverted pendulum vehicle. $\beta_b$ dot is a pitch angular velocity of the two-wheeled inverted pendulum vehicle. $\gamma_b$ dot is a yaw angular velocity of the two-wheeled inverted pendulum vehicle.

[Mathematical Expression 4]

$$\begin{pmatrix} \dot{\alpha}_S \\ \dot{\beta}_S \\ \dot{\gamma}_S \end{pmatrix} = \begin{pmatrix} \cos\beta_{0\alpha} & 0 & -\sin\beta_{0\alpha} \\ 0 & 1 & 0 \\ \sin\beta_{0\alpha} & 0 & \cos\beta_{0\alpha} \end{pmatrix} \begin{pmatrix} 1 & 0 & 0 \\ 0 & \cos\alpha_{0\beta} & \sin\alpha_{0\beta} \\ 0 & -\sin\alpha_{0\beta} & \cos\alpha_{0\beta} \end{pmatrix} \begin{pmatrix} \dot{\alpha}_b \\ \dot{\beta}_b \\ \dot{\gamma}_b \end{pmatrix} \quad (4)$$

[Mathematical Expression 5]

$$\begin{pmatrix} \dot{\alpha}_b \\ \dot{\beta}_b \\ \dot{\gamma}_b \end{pmatrix} = \begin{pmatrix} 1 & 0 & 0 \\ 0 & \cos\alpha_{0\beta} & -\sin\alpha_{0\beta} \\ 0 & \sin\alpha_{0\beta} & \cos\alpha_{0\beta} \end{pmatrix} \begin{pmatrix} \cos\beta_{0\alpha} & 0 & \sin\beta_{0\alpha} \\ 0 & 1 & 0 \\ -\sin\beta_{0\alpha} & 0 & \cos\beta_{0\alpha} \end{pmatrix} \begin{pmatrix} \dot{\alpha}_S \\ \dot{\beta}_S \\ \dot{\gamma}_S \end{pmatrix} \quad (5)$$

When the fact that $\alpha_{0\beta}$ and $\beta_{0\alpha}$ in the above mathematical expression (5) both are small values close to zero is taken into consideration, the above mathematical expression (5) may be modified into the following mathematical expression (6).

[Mathematical Expression 6]

$$\begin{pmatrix} \dot{\alpha}_b \\ \dot{\beta}_b \\ \dot{\gamma}_b \end{pmatrix} = \begin{pmatrix} 1 & 0 & \sin\beta_{0\alpha} \\ 0 & 1 & -\sin\alpha_{0\beta} \\ -\sin\beta_{0\alpha} & \sin\alpha_{0\beta} & 1 \end{pmatrix} \begin{pmatrix} \dot{\alpha}_S \\ \dot{\beta}_S \\ \dot{\gamma}_S \end{pmatrix} = \begin{pmatrix} \dot{\alpha}_S + \dot{\gamma}_S \cdot \sin\beta_{0\alpha} \\ \dot{\beta}_S - \dot{\gamma}_S \cdot \sin\alpha_{0\beta} \\ \dot{\gamma}_S - \dot{\alpha}_S \cdot \sin\beta_{0\alpha} + \dot{\beta}_S \cdot \sin\alpha_{0\beta} \end{pmatrix} \quad (6)$$

From above, parameters required to correct mounting errors are the mounting angle deviation $\alpha_{0acc}$ around the roll axis and the mounting angle deviation $\beta_{0acc}$ around the pitch axis between the acceleration sensor and the body reference axis, the mounting angle deviation $\alpha_{0\beta}$ around the pitch axis between the measuring axis of the roll axis gyro and the body reference roll axis, and the mounting angle deviation $\beta_{0\alpha}$ around the roll axis between the measuring axis of the pitch axis gyro and the body reference pitch axis. When it is possible to accurately measure these four deviations, it is possible to accurately obtain inclination angles and rotation angular velocities in the body reference coordinate system by simply computing inverse rotation even when there are mounting deviations of the sensors. This means that, in the above mathematical expression (6), when a turn is made around the yaw axis in a state where mounting deviations are left as it is, the roll angular velocity $\alpha_s$ dot of the roll axis gyro and the pitch angular velocity $\beta_s$ dot of the pitch axis gyro vary, and, as a result, the roll angle $\alpha$ and the pitch angle $\beta$ that are integral values of the roll angular velocity $\alpha_s$ dot and the pitch angular velocity $\beta_s$ dot are influenced.

The resolution theory in the background of the adjustment mode is described above.

Hereinafter, the control flow of FIG. 5 will be described sequentially.

First, as shown in FIG. 4, the two-wheeled inverted pendulum vehicle 1 is set on the horizontal turning device 30, and is set in a stationary state where the reference yaw axis of the two-wheeled inverted pendulum vehicle body 2 is parallel to the vertical direction. Subsequently, the control mode of the control device 8 is changed from a stop mode to the adjustment mode (S300). Then, the control device 8 acquires output values $X_0$ and $Y_0$ of the acceleration sensor 16 in the above-described stationary state (S310). At this time, accurate output values $X_0$ and $Y_0$ are obtained without noise by averaging the output values $X_0$ and $Y_0$ for a sufficiently long period of time. Similarly, the control device 8 acquires output values $\alpha_0$ dot (output value of the roll axis angular velocity sensor), $\beta_0$ dot (output value of the pitch axis angular velocity sensor) and $\gamma_0$ dot of the angular velocity sensor 15 in the above-described stationary state (S310). The output values are stored in the angular velocity storage unit 22 of the error correction unit 13. At this time, accurate output values $\alpha_0$ dot, $\beta_0$ dot and $\gamma_0$ dot are obtained without noise by averaging the output values $\alpha_0$ dot, $\beta_0$ dot and $\gamma_0$ dot for a sufficiently long period of time. The control device 8 stores the acquired output values $\alpha_0$ dot, $\beta_0$ dot and $\gamma_0$ dot in the angular velocity storage unit 22 of the error correction unit 13. Note that, in the above-described stationary state, the output values $\alpha_0$ dot, $\beta_0$ dot and $\gamma_0$ dot should be zero intrinsically; however, these values are actually not zero due to a drift of the angular velocity sensors. In this meaning, the output value $\beta_0$ dot is a bias value of the pitch axis angular velocity sensor of the angular velocity sensor 15 in the stationary state. Similarly, the output value $\alpha_0$ dot is a bias value of the roll axis angular velocity sensor of the angular velocity sensor 15 in the stationary state. The suffix "0" indicates the stationary state.

Subsequently, the two-wheeled inverted pendulum vehicle 1 is turned on a pivot on the horizontal turning device 30 in the counter clockwise direction (S320). More specifically, by turning the two-wheeled inverted pendulum vehicle 1 on the spot at a predetermined turning angular velocity $\gamma_1$ dot in a state where the reference yaw axis of the two-wheeled inverted pendulum vehicle body 2 of the two-wheeled inverted pendulum vehicle 1 is parallel to the vertical direction (S320), the two-wheeled inverted pendulum vehicle 1 is placed in a turning state. Subsequently, the control device 8 acquires outputs from the pitch axis angular velocity sensor and the roll axis angular velocity sensor in the turning state of the two-wheeled inverted pendulum vehicle 1 (S330). In the turning state of the two-wheeled inverted pendulum vehicle 1, the output value of the pitch axis angular velocity sensor is denoted by $\beta_1$ dot, and, similarly, the output value of the roll axis angular velocity sensor is denoted by $\alpha_1$ dot. The suffix "1" indicates the turning state. Desirably, accurate $\alpha_1$ dot and $\beta_1$ dot are obtained without noise by averaging $\alpha_1$ dot and $\beta_1$ dot for a sufficient period of time. $\alpha_1$ dot and $\beta_1$ dot are slightly different from $\alpha_0$ dot and $\beta_0$ dot because they contain a turning component around the yaw axis. $\beta_1$ dot corresponds to a bias value of the pitch axis angular velocity sensor in the turning state, and, similarly, $\alpha_1$ dot corresponds to a bias value of the roll axis angular velocity sensor in the turning state (S330).

Then, the mounting angle error computing unit 23 estimates a mounting angle error of the pitch axis angular velocity sensor and a mounting angle error of the roll axis angular velocity sensor with respect to the two-wheeled inverted pendulum vehicle body 2 on the basis of the bias values $\alpha_0$ dot and $\beta_0$ dot of the sensors in the stationary state, the bias values $\alpha_1$ dot and $\beta_1$ dot of the sensors in the turning state and the predetermined turning angular velocity $\gamma_1$ dot (S340). The following mathematical expressions (7) and (8) derived from the above-described mathematical expression (6) are used in the above estimation.

[Mathematical Expression 7]

$$\dot{\alpha}_1 - \dot{\alpha}_0 = \dot{\gamma}_1 \cdot \sin\alpha_{0\alpha} \Rightarrow \beta_{0\alpha} = \sin^{-1}\left(\frac{\dot{\alpha}_1 - \dot{\alpha}_0}{\dot{\gamma}_1}\right) \quad (7)$$

[Mathematical Expression 8]

$$\dot{\beta}_1 - \dot{\beta}_0 = -\dot{\gamma}_1 \cdot \sin\alpha_{0\beta} \Rightarrow \alpha_{0\beta} = \sin^{-1}\left(\frac{\dot{\beta}_1 - \dot{\beta}_0}{\dot{\gamma}_1}\right) \quad (8)$$

In addition, the following mathematical expressions (9) and (10) are used for errors of mounting angles of the acceleration sensor 16 with respect to the two-wheeled inverted pendulum vehicle body 2 (S340). Where a variable g in the following mathematical expressions (9) and (10) is a gravitational acceleration.

[Mathematical Expression 9]

$$X_0 = g \cdot \sin\beta_{0\alpha} \Rightarrow \beta_{0\alpha} = \sin^{-1}\left(\frac{X_0}{g}\right) \quad (9)$$

[Mathematical Expression 10]

$$Y_0 = -g \cdot \sin\alpha_{0acc} \Rightarrow \alpha_{0acc} = \sin^{-1}\left(-\frac{Y_0}{g}\right) \quad (10)$$

Subsequently, the control device 8 stops the pivot turn of the two-wheeled inverted pendulum vehicle 1 (S350), and then turns the two-wheeled inverted pendulum vehicle 1 on a pivot on the horizontal turning device 30 in the clockwise direction (S360).

The control flow of S370 to S390 is the same as the control flow of S330 to S350, so the description thereof is omitted.

Finally, the mounting angle error storage unit 24 obtains average values between the values calculated in S340 and the values calculated in S380 (S400), and, for example, stores the average values in the RAM of the control device 8, that includes the mounting angle error storage unit 24 shown in FIG. 2 (S410). After that, the control device 8 completes the adjustment mode (S420), and returns the control from the adjustment mode to the normal travel mode.

After returning to the normal travel mode, the angular velocity correction unit 25 of the error correction unit 13 shown in FIG. 2 extracts the values from the mounting angle error storage unit 24, corrects the output values from the angular velocity sensor 15 as needed, and then outputs the values to the attitude angle computing unit 18. By so doing, even when there are errors of the mounting angles of the angular velocity sensor 15 with respect to the two-wheeled inverted pendulum vehicle body 2, it is possible to apparently remove the errors with low-cost calculation.

Similarly, due to the values obtained in the above-described mathematical expressions (9) to (10), it is possible to apparently remove errors of the mounting angles of the acceleration sensor 16 with respect to the two-wheeled inverted pendulum vehicle body 2 with low-cost calculation.

The first embodiment of the invention is described above, and the advantages of the first embodiment are as follows.

That is, a method of estimating, in the two-wheeled inverted pendulum vehicle 1 that includes the two-wheeled inverted pendulum vehicle body 2 and the angular velocity sensor 15 (the pitch axis angular velocity sensor and the roll axis angular velocity sensor) mounted on the two-wheeled inverted pendulum vehicle body 2, a mounting angle error of the pitch axis angular velocity sensor and a mounting angle error of the roll axis angular velocity sensor with respect to the two-wheeled inverted pendulum vehicle body 2 includes the following steps.

(1) A step of acquiring a bias value of the pitch axis angular velocity sensor and a bias value of the roll axis angular velocity sensor in the stationary state where the reference yaw axis Z of the two-wheeled inverted pendulum vehicle body 2 is parallel to the vertical direction by acquiring an output from the pitch axis angular velocity sensor and an output from the roll axis angular velocity sensor in the stationary state.

(2) A step of acquiring a bias value of the pitch axis angular velocity sensor and a bias value of the roll axis angular velocity sensor in the turning state where the two-wheeled inverted pendulum vehicle 1 is turned at the predetermined turning angular velocity $\gamma_1$ dot in a state where the reference yaw axis Z of the two-wheeled inverted pendulum vehicle body 2 is parallel to the vertical direction by acquiring an output from the pitch axis angular velocity sensor and an output from the roll axis angular velocity sensor in the turning state.

(3) A step of estimating the mounting angle error of the pitch axis angular velocity sensor and the mounting angle error of the roll axis angular velocity sensor with respect to the two-wheeled inverted pendulum vehicle body 2 on the basis of the bias values of the sensors in the stationary state, the bias values of the sensors in the turning state and the predetermined turning angular velocity $\gamma_1$ dot.

With the above-described method, it is possible to estimate a mounting angle error of the pitch axis angular velocity sensor and a mounting angle error of the roll axis angular velocity sensor with respect to the two-wheeled inverted pendulum vehicle body 2.

Figure 6:
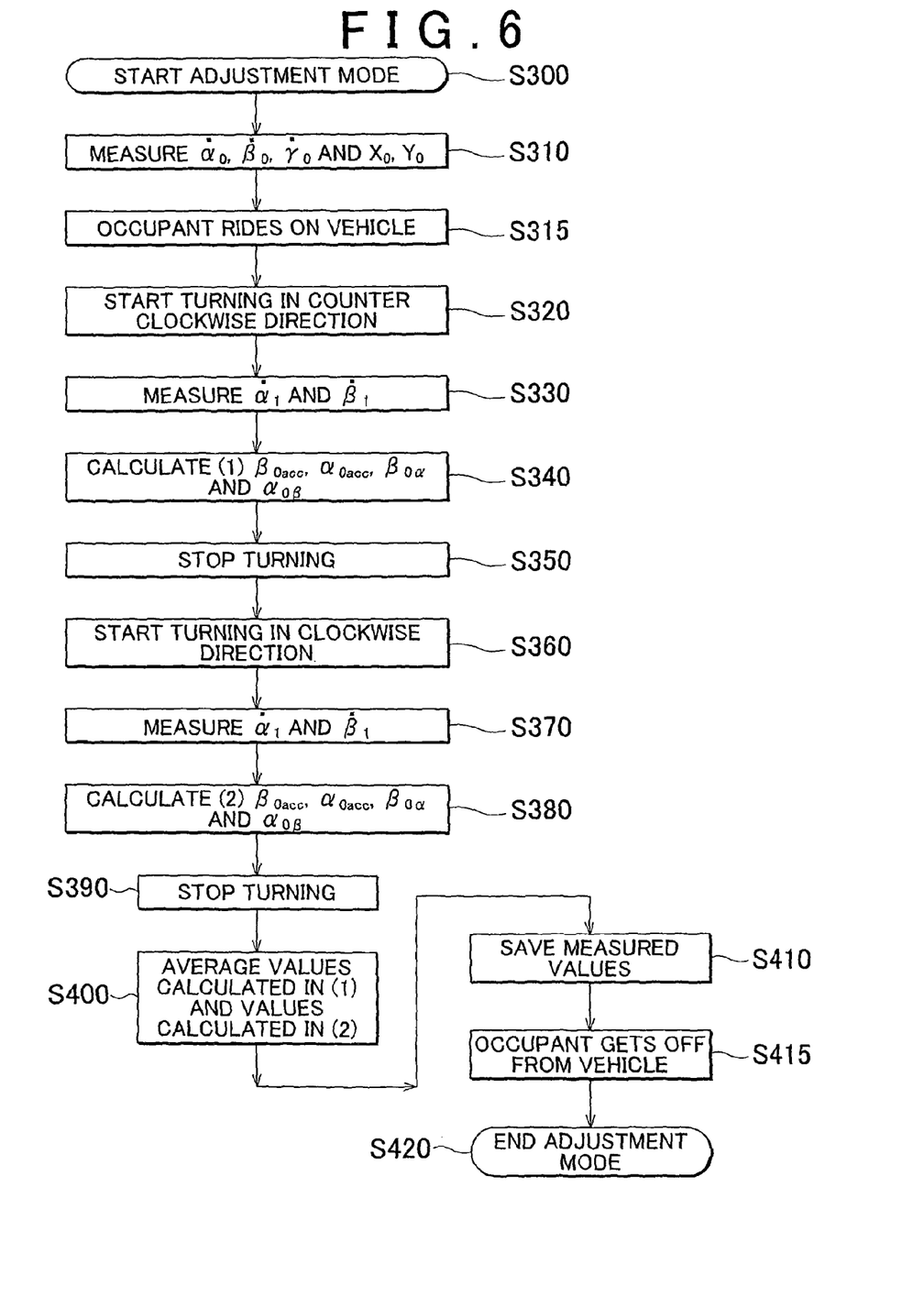
FIG. 6 is a control flow of an adjustment mode according to a second embodiment.

Next, a second embodiment of the invention will be described with reference to FIG. 6. Here, points that the present embodiment differs from the above-described first embodiment will be specifically described, and overlap description is omitted where appropriate.

In the present embodiment, instead of the horizontal turning device 30, a simple level is used to create the stationary state, after that, an occupant actually rides on the two-wheeled inverted pendulum vehicle 1, and turns the two-wheeled inverted pendulum vehicle 1 on a pivot through operation of the handle body 5. Description will be made using the control flow shown in FIG. 6. In S310, the stationary state is created with the use of the level. Then, in S315, the occupant rides on the two-wheeled inverted pendulum vehicle 1. S350, S360 and S390 are also performed through occupant's operation of the handle body 5, and the occupant gets off from the two-wheeled inverted pendulum vehicle 1 in S415.

The invention claimed is:

1. A method of estimating, in an inverted pendulum mobile unit that includes an inverted pendulum mobile unit body, a pitch axis angular velocity sensor, a roll axis angular velocity sensor and at least one central processing unit, a mounting angle error of the pitch axis angular velocity sensor and a mounting angle error of the roll axis angular velocity sensor with respect to the inverted pendulum mobile unit body, the method comprising:

acquiring, by the central processing unit, a first angular pitch axis angular velocity and a first roll axis angular velocity respectively from the pitch axis angular velocity sensor and the roll axis angular velocity sensor in a stationary state where a reference yaw axis of the inverted pendulum mobile unit body is stationary in a vertical direction;

acquiring, by the central processing unit, a second angular pitch axis angular velocity and a second roll axis angular velocity respectively from the pitch axis angular velocity sensor and the roll axis angular velocity sensor in a turning state where the inverted pendulum mobile unit is turned at a predetermined turning angular velocity in a state where the reference yaw axis of the inverted pendulum mobile unit body remains parallel to the vertical direction; and estimating, by the central processing unit, the mounting angle error of the pitch axis angular velocity sensor and the mounting angle error of the roll axis angular velocity sensor with respect to the inverted pendulum mobile unit body based on the first angular pitch axis angular velocity, the first roll axis angular velocity, the second angular pitch axis angular velocity, the second roll axis angular velocity and the predetermined turning angular velocity.

2. The method according to claim 1, wherein
in the turning state, the mobile unit body is turned on the spot while being held horizontally.

3. The method according to claim 2, wherein
the inverted pendulum mobile unit is turned on a pivot in an inverted state.

4. The method according to claim 2, wherein
the inverted pendulum mobile unit is turned on a pivot on a rotary jig of a turning device,
the turning device includes: a support base that supports the inverted pendulum mobile unit; a plurality of support legs that are adjustable in height and that are connected to the support base; and the rotary jig,
the rotary jig includes a first member connected to the support base and a second member connected to the inverted pendulum mobile unit body,
the first member is coupled to the second member such that the first member is rotatable in parallel with the support base.

5. The turning device used in the method according to claim 2, comprising:
a support base configured to support the inverted pendulum mobile unit;
a plurality of support legs that are adjustable in height and that are connected to a lower surface of the support base; and
a rotary jig that includes a first member and a second member, wherein
the first member is connected to an upper surface of the support base,
the second member is positioned over the first member,
an upper surface of the second member is connected to the inverted pendulum mobile unit body, and
the first member is coupled to the second member such that the first member is rotatable in parallel with the support base.

6. The method according to claim 1, wherein
in the stationary state, an output from the pitch axis angular velocity sensor and the output from the roll axis angular velocity sensor each are averaged for a predetermined period of time or longer by the central processing unit.

7. The method according to claim 1, wherein
in the turning state, an output from the pitch axis angular velocity sensor and the output from the roll axis angular velocity sensor each are averaged for a predetermined period of time or longer by the central processing unit.

8. The method according to claim 1, wherein
the mounting angle error of the pitch axis angular velocity sensor and the mounting angle error of the roll axis angular velocity sensor are estimated by the central processing unit based on following expressions:

$$\beta_{0\alpha} = \sin^{-1}\left(\frac{\alpha_1 - \alpha_0}{\hat{\gamma}_1}\right)$$

$$\alpha_{0\beta} = \sin^{-1}\left(-\frac{\beta_1 - \beta_0}{\hat{\gamma}_1}\right)$$

wherein $\alpha_{0\beta}$ indicates the mounting angle error of the roll axis angular velocity sensor with respect to a pitch angle,
$\beta_{0\alpha}$, indicates the mounting angle error of the pitch axis angular velocity sensor with respect to a roll angle,
$\alpha_0$ indicates the first roll axis angular velocity,
$\beta_0$ indicates the first angular pitch axis angular velocity,
$\alpha_1$ indicates the second roll axis angular velocity,
$\beta_1$ indicates the second angular pitch axis angular velocity, and
$\gamma_1$ indicates the predetermined turning angular velocity.

9. A turning device comprising:
a support base that is configured to support an inverted pendulum mobile unit;
a plurality of support legs that are adjustable in height and that are connected to a lower surface of the support base; and
a rotary jig that includes a first member and a second member, wherein
the first member is connected to an upper surface of the support base,
the second member is positioned over the first member,
an upper surface of the second member is connected to an inverted pendulum mobile unit body, and
the first member is coupled to the second member such that the first member is rotatable in parallel with the support base.

* * * * *